United States Patent
Santoro et al.

(10) Patent No.: US 12,073,959 B2
(45) Date of Patent: Aug. 27, 2024

(54) PROTECTIVE DEVICE FOR ELECTRICAL CONDUIT SYSTEM

(71) Applicant: HUBBELL INCORPORATED, Shelton, CT (US)

(72) Inventors: Nicholas Adam Santoro, Edwardsville, IL (US); Christopher John Minski, St. Louis, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 668 days.

(21) Appl. No.: 17/344,157

(22) Filed: Jun. 10, 2021

(65) Prior Publication Data

US 2021/0391103 A1    Dec. 16, 2021

Related U.S. Application Data

(60) Provisional application No. 63/038,406, filed on Jun. 12, 2020.

(51) Int. Cl.
| | | |
|---|---|---|
| H01B 17/38 | (2006.01) | |
| H01B 17/58 | (2006.01) | |
| H01R 13/512 | (2006.01) | |
| H01R 13/52 | (2006.01) | |

(52) U.S. Cl.
CPC ............ *H01B 17/38* (2013.01); *H01B 17/58* (2013.01); *H01R 13/512* (2013.01); *H01R 13/5205* (2013.01)

(58) Field of Classification Search
CPC ...... H01B 17/38; H01B 17/58; H01R 13/512; H01R 13/5205; H02G 3/06
See application file for complete search history.

(56) References Cited

U.S. PATENT DOCUMENTS

| | | | |
|---|---|---|---|
| 4,515,991 A | | 5/1985 | Hutchison |
| 5,321,205 A | | 6/1994 | Bawa et al. |
| 5,460,532 A | | 10/1995 | Leto |
| 5,871,239 A | | 2/1999 | Boscaljon |
| 5,994,644 A | * | 11/1999 | Rindoks ............... A47B 96/14 108/50.02 |
| 6,022,231 A | | 2/2000 | Williams |
| 6,168,213 B1 | | 1/2001 | Muller |

(Continued)

FOREIGN PATENT DOCUMENTS

| | | |
|---|---|---|
| DE | 102016004978 A1 | 10/2017 |
| GB | 2178909 A | 2/1987 |

OTHER PUBLICATIONS

EatonVideos: "Terminator (TM) II TMCX Cable Gland Installation", YOUTBE, Sep. 30, 2015, 1 page. Retrieved from Internet: URL:https://www.youtube.com/watch?v=gQP36rSCCu8.

(Continued)

*Primary Examiner* — Travis S Chambers
(74) *Attorney, Agent, or Firm* — Dilworth IP, LLC

(57) ABSTRACT

A protective device for electrical conduits including a body having a lower opening for engaging with a first conduit and a central cavity for receiving conductors extending from the first conduit to a second conduit, a top member having an upper opening for engaging with the second conduit, and a coupler slidably engaged around the body, the coupler slidable between an open position distal to the top member and a closed position attached to the top member.

27 Claims, 13 Drawing Sheets

(56) References Cited

U.S. PATENT DOCUMENTS

| | | | |
|---|---|---|---|
| 6,632,999 B2* | 10/2003 | Sempliner | F16L 5/00 |
| | | | 52/27 |
| 7,507,907 B2 | 3/2009 | Mueller et al. | |
| 8,841,562 B2 | 9/2014 | Drotleff et al. | |
| 8,872,027 B2 | 10/2014 | Proud | |
| 8,895,878 B2* | 11/2014 | Drotleff | H02G 3/0666 |
| | | | 174/654 |
| 9,484,133 B2 | 11/2016 | Proud | |
| 9,774,178 B2 | 9/2017 | Proud | |
| 10,008,845 B2* | 6/2018 | Maass | H02G 3/0616 |
| 11,035,510 B1* | 6/2021 | Crompton | F16L 37/0915 |
| 11,070,042 B2* | 7/2021 | Santoro | B29C 70/745 |
| 2008/0073102 A1 | 3/2008 | Mueller et al. | |
| 2010/0218992 A1 | 9/2010 | Smith | |
| 2012/0282793 A1 | 11/2012 | Brune et al. | |
| 2014/0020950 A1 | 1/2014 | Drotleff | |
| 2018/0131170 A1 | 5/2018 | Maass | |
| 2021/0305800 A1 | 9/2021 | Santoro | |
| 2021/0391103 A1 | 12/2021 | Santoro | |

OTHER PUBLICATIONS

International Search Report and Written Opinion for App. No. PCT/US2021/036759, dated Sep. 1, 2021, 8 pages.

* cited by examiner

PROTECTIVE DEVICE FOR ELECTRICAL CONDUIT SYSTEM

FIELD OF THE INVENTION

The present disclosure relates to electrical conduit systems for protecting conductors, and more particularly, to a protective device with an opening mechanism for introducing sealing compound and facilitating inspection.

BACKGROUND

Electrical conduit systems are generally comprised of tubes or other elongated structures to protect and route electrical wiring in a building or structure. Protective devices, such as seal-off fittings, are installed in various places throughout electrical conduit systems to minimize the passage of gases and vapors and prevent fire from propagating from one electrical installation to another through the conduit system. Seals are generally required, according to the National Electrical Code ("NEC"), to be installed within eighteen inches on any conduit run entering an enclosure containing devices that may produce arcs, sparks, or high temperature. Where two enclosures are connected by a run of conduit not over three feet long, a single seal can be located at the center of the run.

Seal-off fittings are filled with a sealing compound that is applied as a liquid or putty during assembly and takes time to cure and harden. Measures must be taken to prevent the compound from spreading within or leaking out of the fitting during the curing process. Often packing fibers and/or wool materials are packed in the fitting to retain the compound. The sealing compound is applied after the seal-off fitting is installed and the electrical wires are run through the conduit and fitting. Therefore, seal-off fittings typically require one or more small ports on the side for receiving the packing fibers and sealing compound. Packing through such a small port in the fitting can be difficult and time consuming.

The packing fibers do not always provide a sufficient barrier resulting in leakage of the sealing compound. The insufficient barrier and/or leakage can go undetected given that such seal-off fittings do not provide a means for full inspection.

Known seal-off fittings are also difficult to remove and replace. Removal generally requires cutting the fitting or surrounding conduits. Seal-off fittings of the same type generally cannot be reinstalled in the same place after one is removed. Therefore, different retrofit seal-off fittings having a clamshell design must be used.

The present invention solves these and other problems in the prior art.

SUMMARY

An object of the present invention is to provide a protective device with easy access to its interior cavity for filling with sealing compound. A further object is to provide a protective device that can be reopened for inspection and easily replaced and/or retrofitted. A further object is to provide a protective device that is pre-dammed, such as with one or more disk brush barriers, to avoid the necessity for packing fibers.

In one exemplary embodiment according the present disclosure, a protective device is provided including a body having a lower opening for engaging with a first conduit and a central cavity for receiving conductors extending from the first conduit to a second conduit, a top member having an upper opening for engaging with the second conduit, and a coupler slidably engaged around the body, the coupler slidable between an open position distal to the top member and a closed position attached to the top member.

In some embodiments, the protective device includes a barrier assembly within the cavity of the body, the barrier assembly at least partially penetrable by the conductors extending from the first conduit to the second conduit. The barrier assembly may include at least one brush barrier having an outer rim and a plurality of bristles attached to and extending inwardly from the outer rim, the conductors passing through the bristles. The barrier assembly may also include two brush barriers each having an outer edge and a plurality of bristles extending inwardly from the outer edge, the conductors passing through the bristles, and a spacer between the two brush barriers. In some embodiments, the spacer is a wave spring.

In some embodiments, the cavity of the body includes a seat receiving the barrier assembly. The barrier assembly may also include a stop element, wherein the body includes an internal groove receiving the stop element and securing the barrier assembly between the seat and the stop element.

In some embodiments, the body includes a first groove on an exterior surface and a snap ring in the first groove between the body and the coupler, wherein the coupler includes an upper groove engaging with the snap ring in the open position. The coupler may also include a lower groove engaging with the snap ring in the closed position. In some embodiments, the body includes a second groove on an exterior surface and a positioning snap ring removably engaged in the second groove below a lower edge of the coupler to retain the coupler in the closed position.

Further provided is a protective device, including a body having a lower opening, an upper opening, and a cavity extending between the lower and upper openings, a barrier assembly within the cavity of the body, a top member having an upper opening, and a coupler slidably engaged around the body, the coupler slidable between an open position distal to the top member and a closed position attached to the top member.

In some embodiments, the barrier assembly includes at least one brush barrier having an outer rim and a plurality of bristles attached to and extending inwardly from the outer rim. The barrier assembly may also include two brush barriers each having an outer edge and a plurality of bristles extending inwardly from the outer edge, and a spacer between the two brush barriers. In some embodiments, the spacer is a wave spring.

In some embodiments, the body includes a first groove on an exterior surface and a snap ring in the first groove between the body and the coupler, wherein the coupler includes an upper groove engaging with the snap ring in the open position and a lower groove engaging with the snap ring in the closed position. The body may also include a second groove on the exterior surface and a positioning snap ring removably positionable in the second groove below a lower edge of the coupler when the coupler is in the closed position.

Further provided is a method of installing a protective device, including a step of providing a protective device including body having a lower opening, an upper opening, and a cavity extending between the lower and upper openings, a barrier assembly within the cavity of the body, a top member having an upper opening, and a coupler slidably engaged around the body, the coupler slidable between an open position distal to the top member and a closed position attached to the top member. The method further includes steps of securing the body of the protective device, via the lower opening of the body, to a first conduit, securing the top member of the protective device, via the upper opening of the top member, to a second conduit, passing a plurality of conductors from the first conduit, through the cavity of the body by penetrating through the barrier assembly, and into the second conduit, at least partially filling the body with a sealing compound with the coupler in the open position, and closing the protective device by moving the coupler to the closed position.

In some embodiments, the coupler is retained in the closed position via a positioning snap ring engaged in a groove on an exterior surface of the body and below a lower edge of the coupler during the steps of securing the body to the first conduit and securing the top member to the second conduit.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A protective device, such as but not limited to a seal-off fitting, with an opening mechanism for introducing sealing compound and facilitating inspection is disclosed herein. Reference will now be made in detail to the illustrative embodiments of the present disclosure, which are illustrated in the accompanying figures.

Figure 1A:
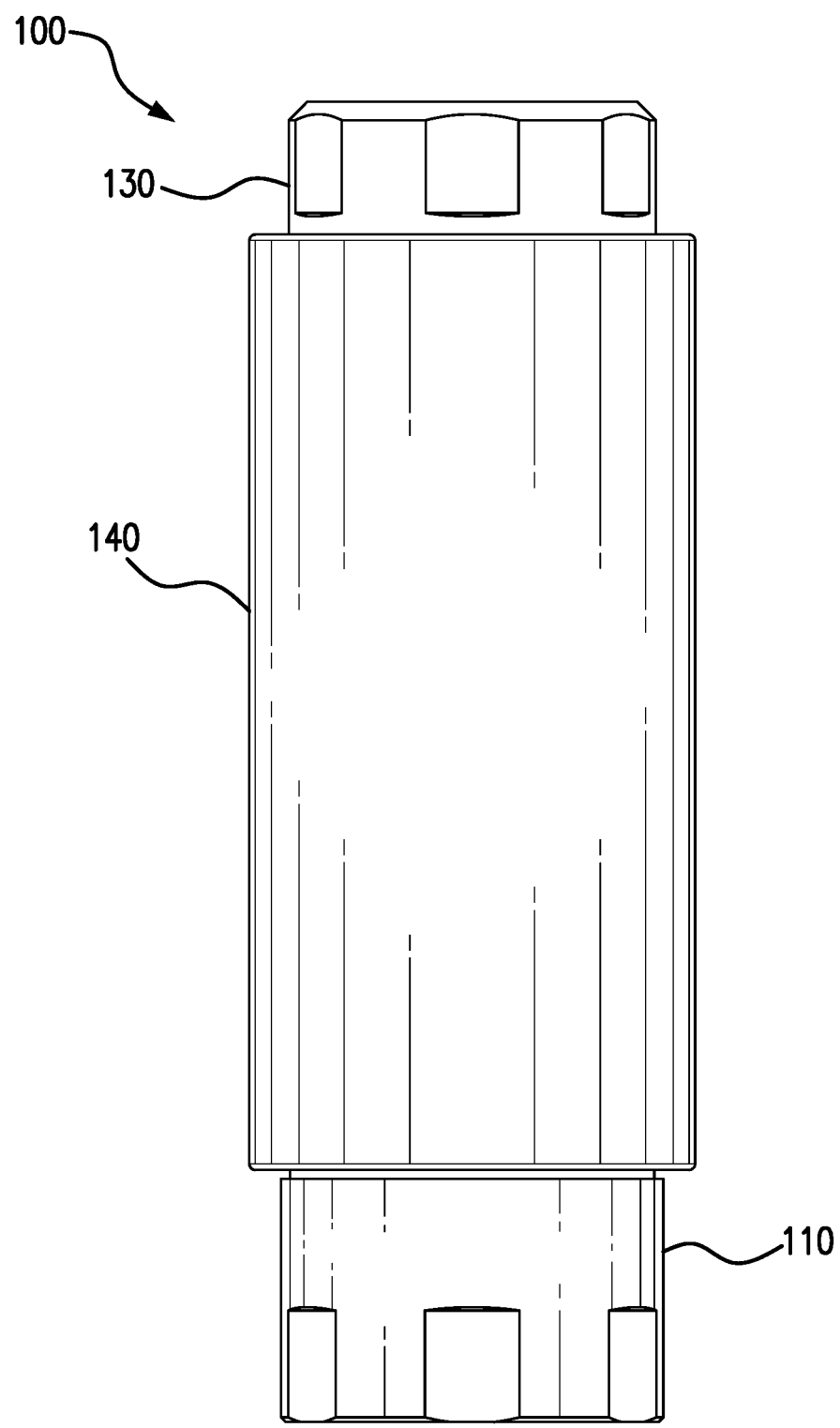
FIG. 1A is a side view of a protective device according to an exemplary embodiment of the present disclosure.
Figure 1B:
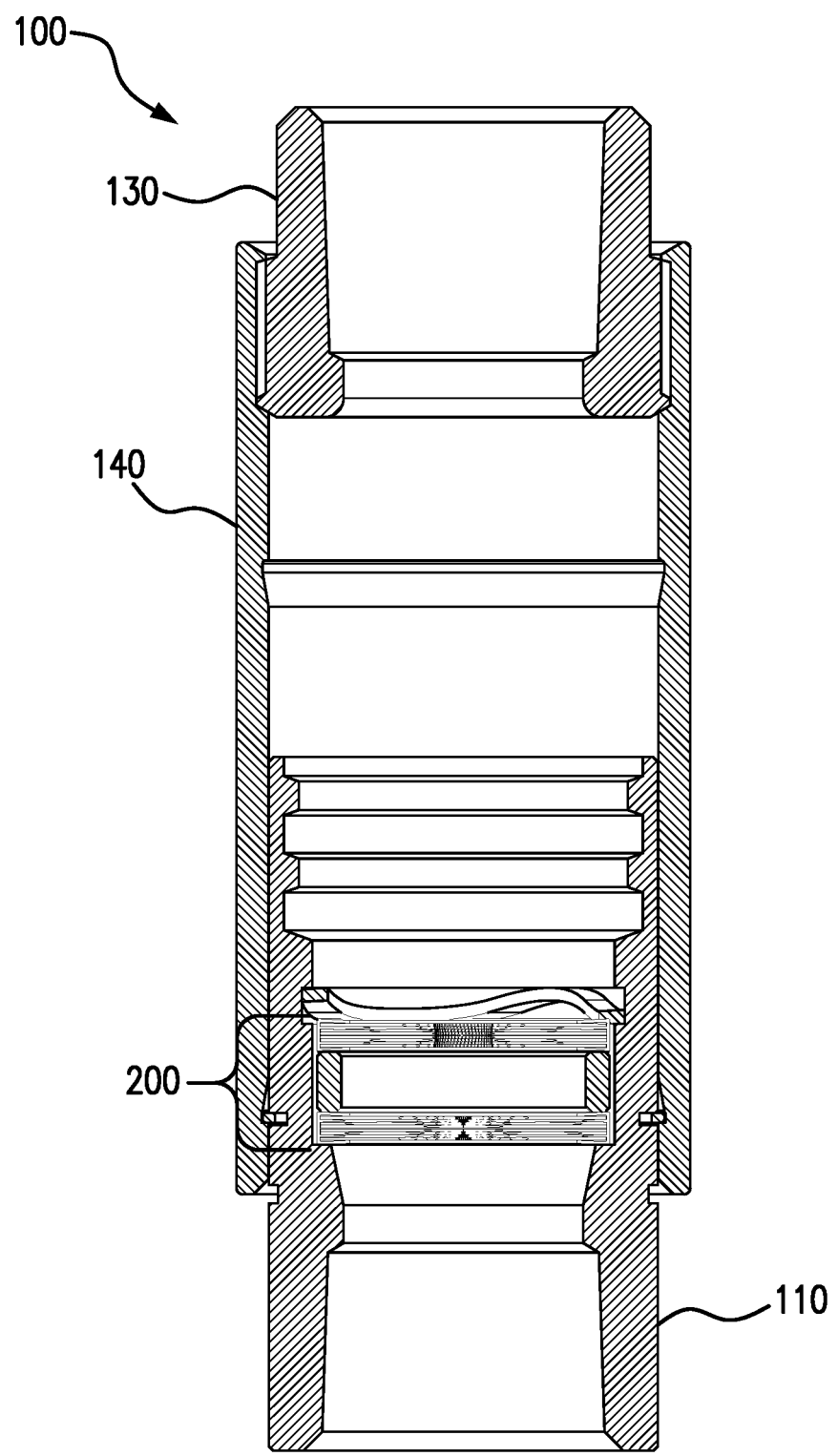
FIG. 1B is a side sectional view of the protective device shown in FIG. 1A.

FIGS. 1A to 1B illustrate a protective device or fitting 100, in particular a seal-off fitting, according to an exemplary embodiment of the present disclosure. The protective device 100 includes a body or potting chamber 110, a top member 130, and a coupler 140. In the exemplary embodiment, the protective device 100 further includes a barrier assembly 200 within the body 110 for retaining sealing compound. The protective device 100 may be comprised of a variety of different materials, such as metals and/or plastics. For example, the protective device 100 is comprised primarily of aluminum in some embodiments or cold drawn steel with a zinc electroplating in other embodiments.

Figure 2:
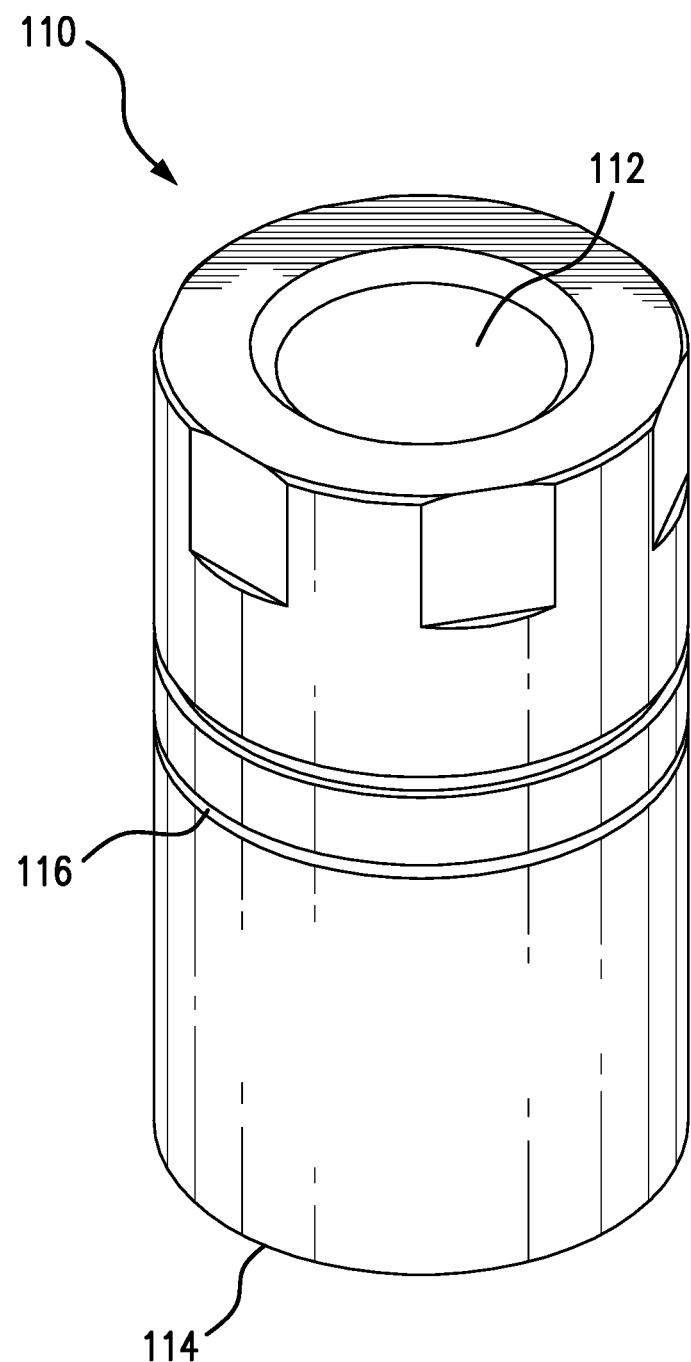
FIG. 2 is a bottom perspective view of a body of a protective device according to an exemplary embodiment of the present disclosure.
Figure 3:
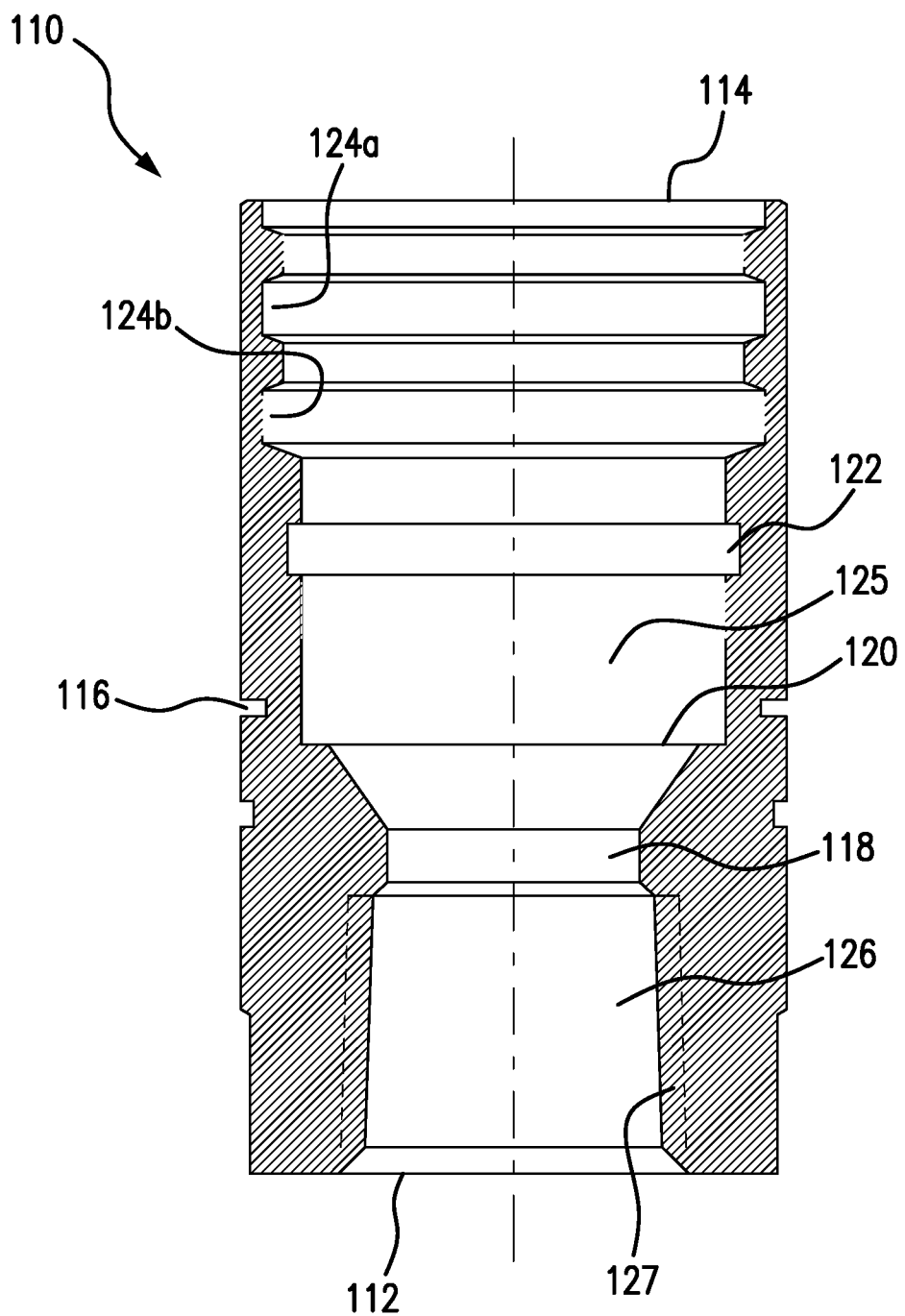
FIG. 3 is a side sectional view of the body shown in FIG. 2.

FIG. 2 illustrates the body 110 (e.g., a potting chamber) in a bottom perspective view. FIG. 3 illustrates the body 110 shown in a side sectional view. The body 110 includes a bottom opening 112, a top opening 114, and a central opening 118 between upper and lower portions 125/126 of the body 110. A central cavity is defined through the body 110 between the bottom opening 112 to the top opening 114. In the exemplary embodiment, the lower portion 126 includes threads 127 on the inside to receive a conduit. The upper portion 125 includes a seat or abutment 120 for a barrier assembly 200 and an internal groove 122 for receiving a stop element such as a snap ring 216 (see FIG. 7) to retain the barrier assembly 200 in place. The upper portion 125 may further include a plurality of indents or grooves 124a/124b (e.g., or other features or texture) in the interior sidewall of the upper portion 125 to receive sealing compound.

The body 110 may be manufactured in a plurality of different sizes to accommodate different applications and conduits. For example, the body 110 may have an exterior diameter of approximately 1.2 inches and ½ inch—14 NPT gage threads in the bottom opening 112. In another embodiment, the body 110 may have an exterior diameter of approximately 1.2 inches and ¾ inch—14 NPT gage threads in the bottom opening 112. In another embodiment, the body 110 may have an exterior diameter of approximately 1.6 inches and 1 inch—11.5 NPT gage threads in the bottom opening 112. However, these are only exemplary and not intended to be limiting.

Figure 8A:
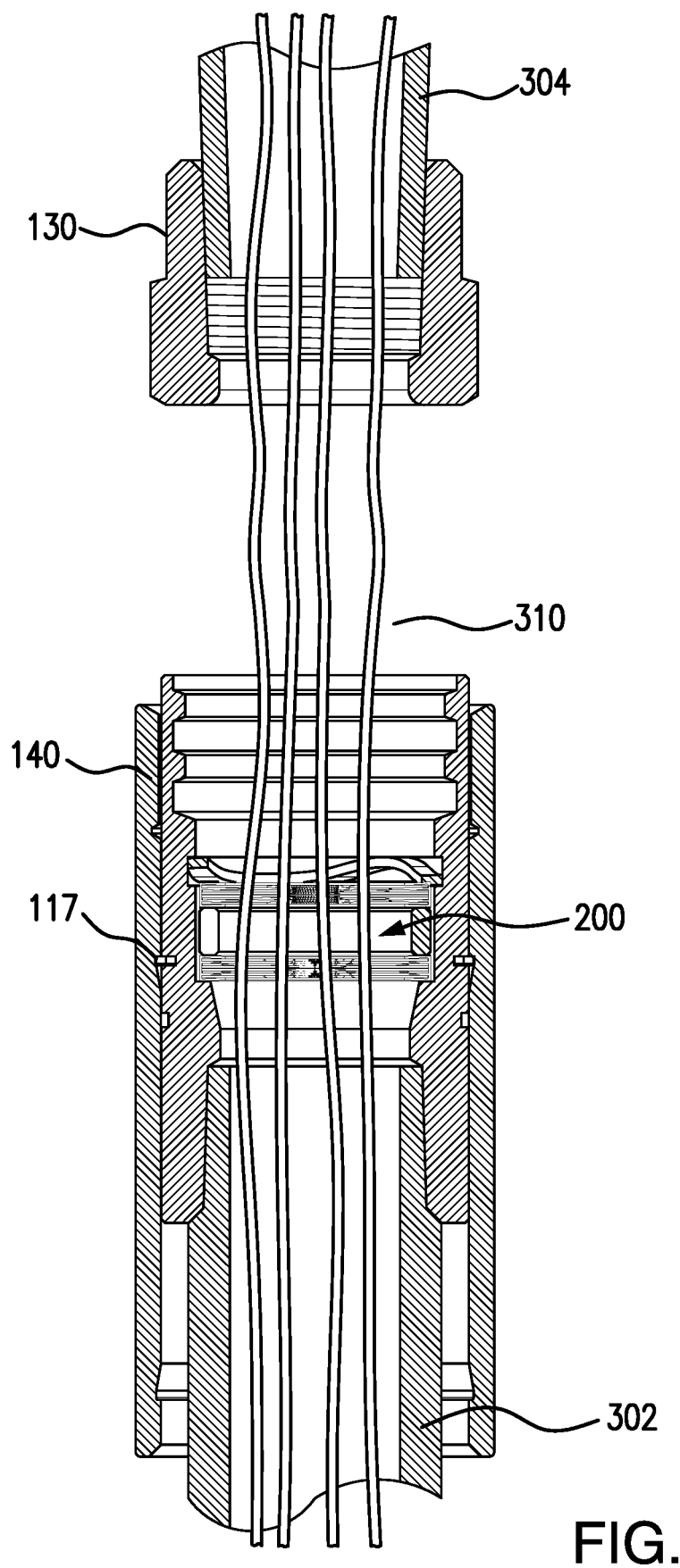
FIG. 8A is a side sectional view of a protective device according to an exemplary embodiment of the present disclosure in an open position.
Figure 8B:
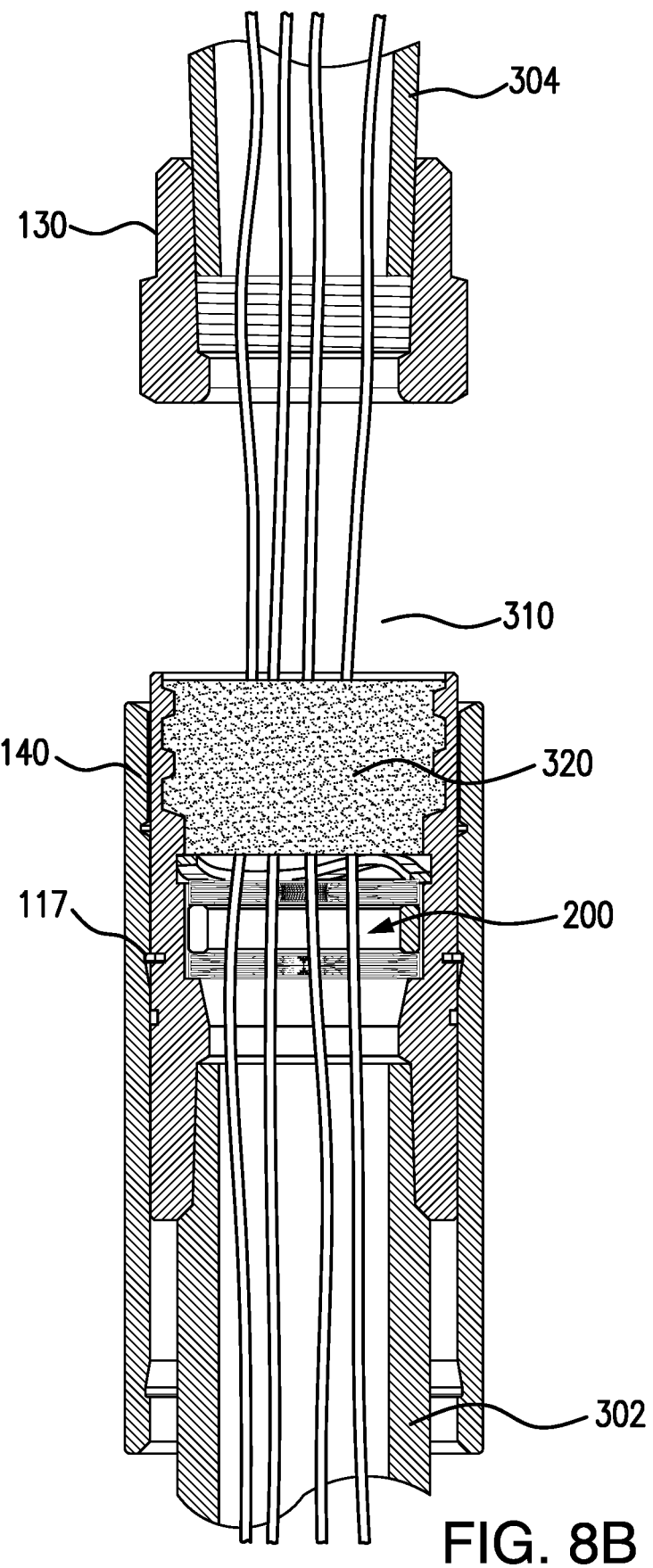
FIG. 8B is a side sectional view of the protective device shown in FIG. 8A, filled with a sealing compound, in an open position.
Figure 8C:
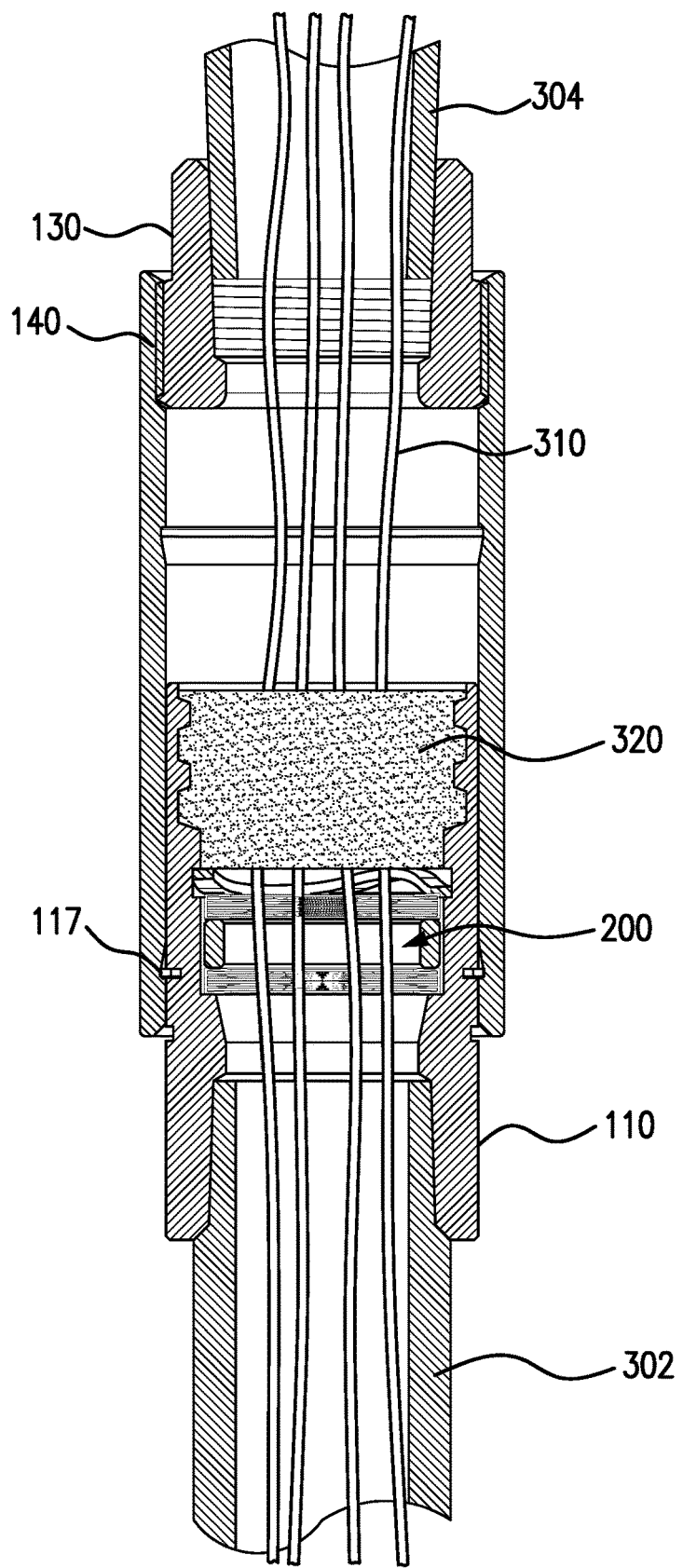
FIG. 8C is a side sectional view of the protective device shown in FIG. 8B, filled with a sealing compound, in a closed position.

The exterior of the body 110 includes a groove 116 for receiving a snap ring 117 (see also FIGS. 8A-8C). The snap ring 117 at least partially circumscribes the body 110 and protrudes from the groove 116 to engage with grooves on the interior of the coupler 140. As shown in FIGS. 8A to 8C, the snap ring 117 engages with upper and lower grooves 148/150 in the coupler 140 to limit movement of the coupler 140 between an open position (FIGS. 8A-8B) and a closed position (FIG. 8C). The snap ring 117 is tensioned outward against the interior wall of the coupler 140 to facilitate its engagement into the grooves 148/150. In some embodiments, the exterior of the body 110 includes two grooves 116 and two snap rings 117.

Figure 4:
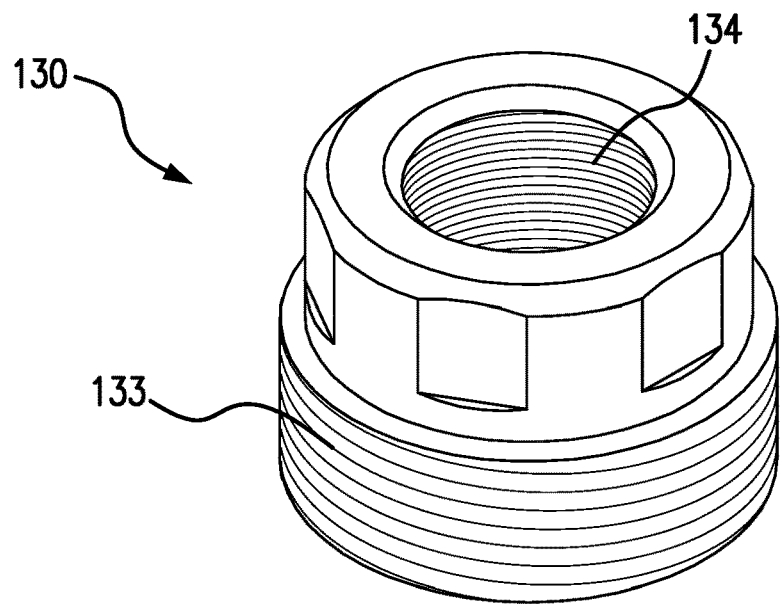
FIG. 4 is a top perspective view of a top member of a protective device according to an exemplary embodiment of the present disclosure.
Figure 5:
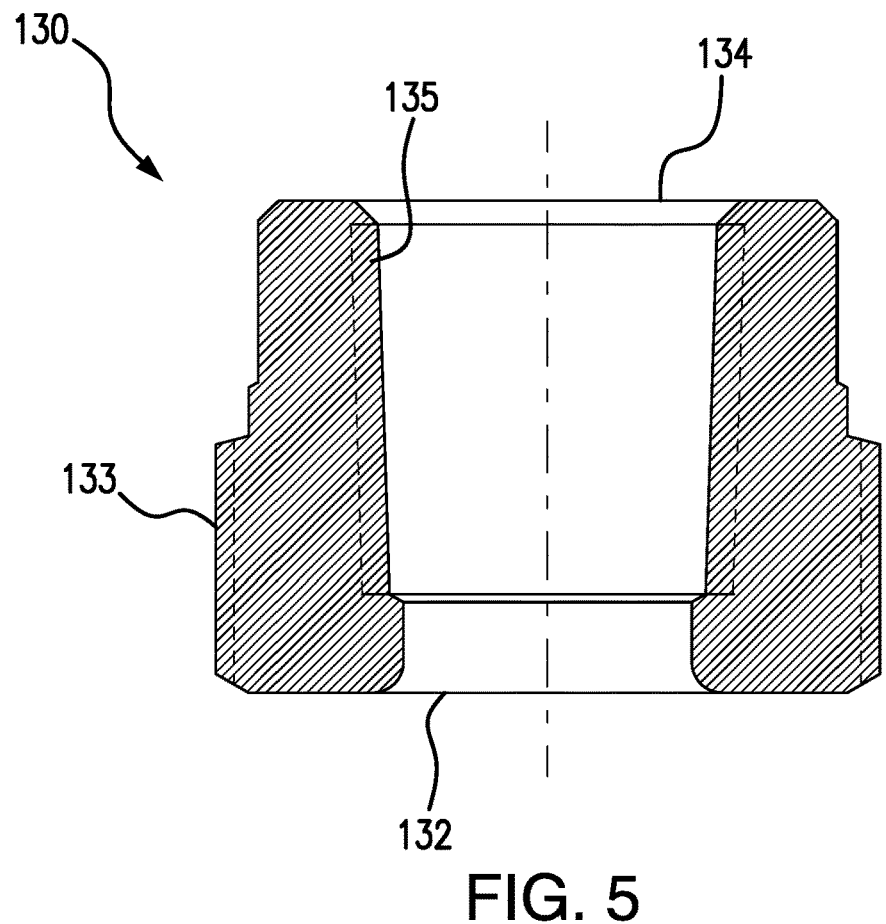
FIG. 5 is a side sectional view of the top member shown in FIG. 4.

FIG. 4 illustrates the top member 130 in a perspective view. FIG. 5 illustrates the top member 130 shown in a side sectional view. The top member 130 includes exterior threads 133, a bottom opening 132 and a top opening 134. The exterior threads 133 (such as, e.g., 1⅜ inch—16 UN—2A, 1¾ inch—16 UN—2A, or any other suitable threads) engage with threads on the interior of the coupler 140 when the protective device 100 is closed. In the exemplary embodiment, the top member 130 mates with the coupler 140 via eight (8) straight threads to provide a suitable flame path. The top opening 134 includes threads 135 to engage with a conduit.

Like the body 110, the top member 130 may be manufactured in a plurality of different sizes to accommodate different applications and conduits. The exterior threads 133 may be selected to accommodate different sized couplers 140. The top member 130 may have an exterior diameter (at the top across the flats) of approximately 1.2 inches and ½ inch—14 NPT gage threads in the top opening 134. In another embodiment, the top member 130 may have an exterior diameter (at the top across the flats) of approximately 1.2 inches and ¾ inch—14 NPT gage threads in the top opening 134. In another embodiment, the top member 130 may have an exterior diameter (at the top across the flats) of approximately 1.6 inches and 1 inch—11.5 NPT gage threads in the top opening 134. However, these are only exemplary and not intended to be limiting.

Figure 6:
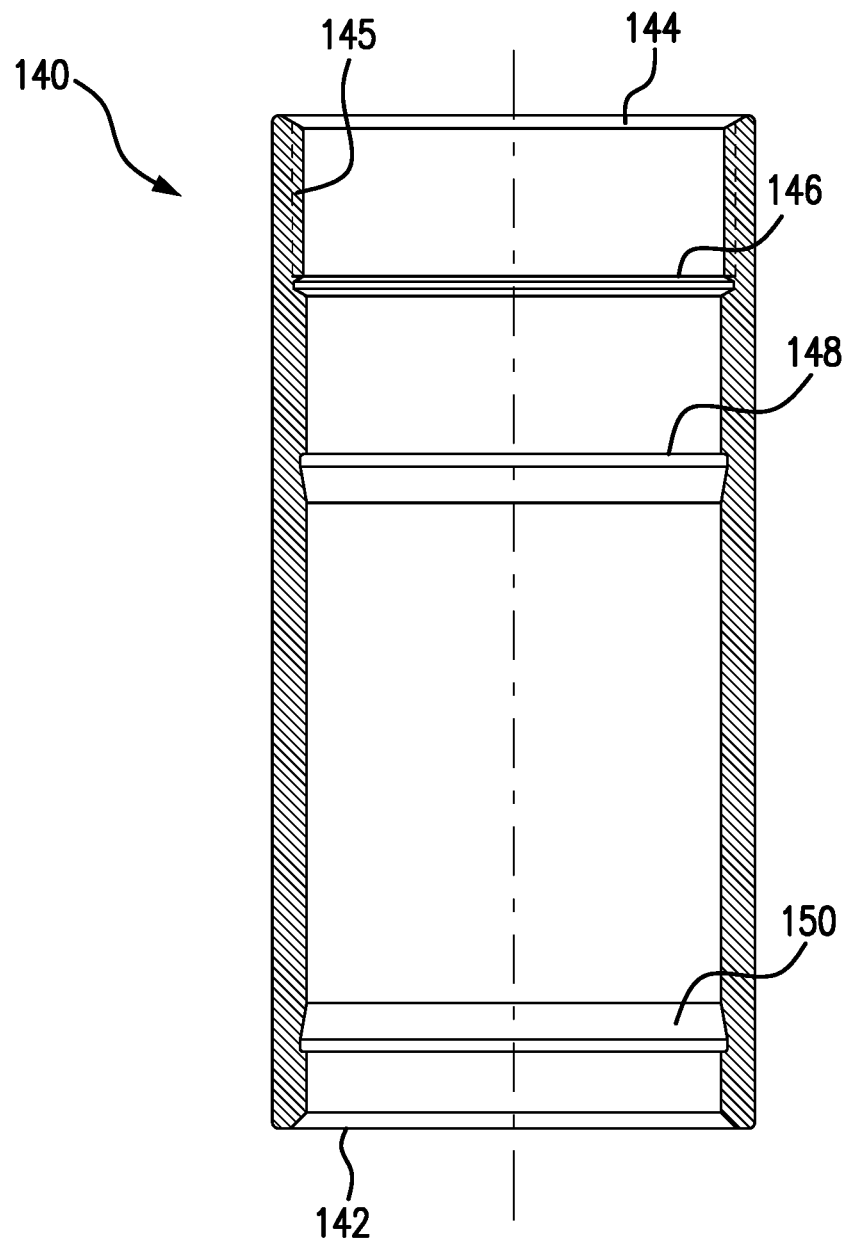
FIG. 6 is a side sectional view of a coupler of a protective device according to an exemplary embodiment of the present disclosure.

FIG. 6 illustrates a side sectional view of the coupler 140 which slidably engages around the body 110. The coupler 140 includes a bottom opening 142 and a top opening 144. The top opening 144 includes threads 145 and a seat or abutment 146 for engaging with the top member 130. The inside of the coupler 140 may include grooves 148 and 150 for engaging with the snap ring 117 in the groove 116 of the body 110 to limit the travel of the coupler 140 as it slides up to close the protective device 100 and down to open the protective device 100. As noted above, the snap ring 117 is tensioned outward against the interior wall of the coupler 140. Ramp elements in the grooves 148/150 allow for the engagement to be released and the coupler 140 unlocked after a sufficient axial force is provided.

Figure 7:
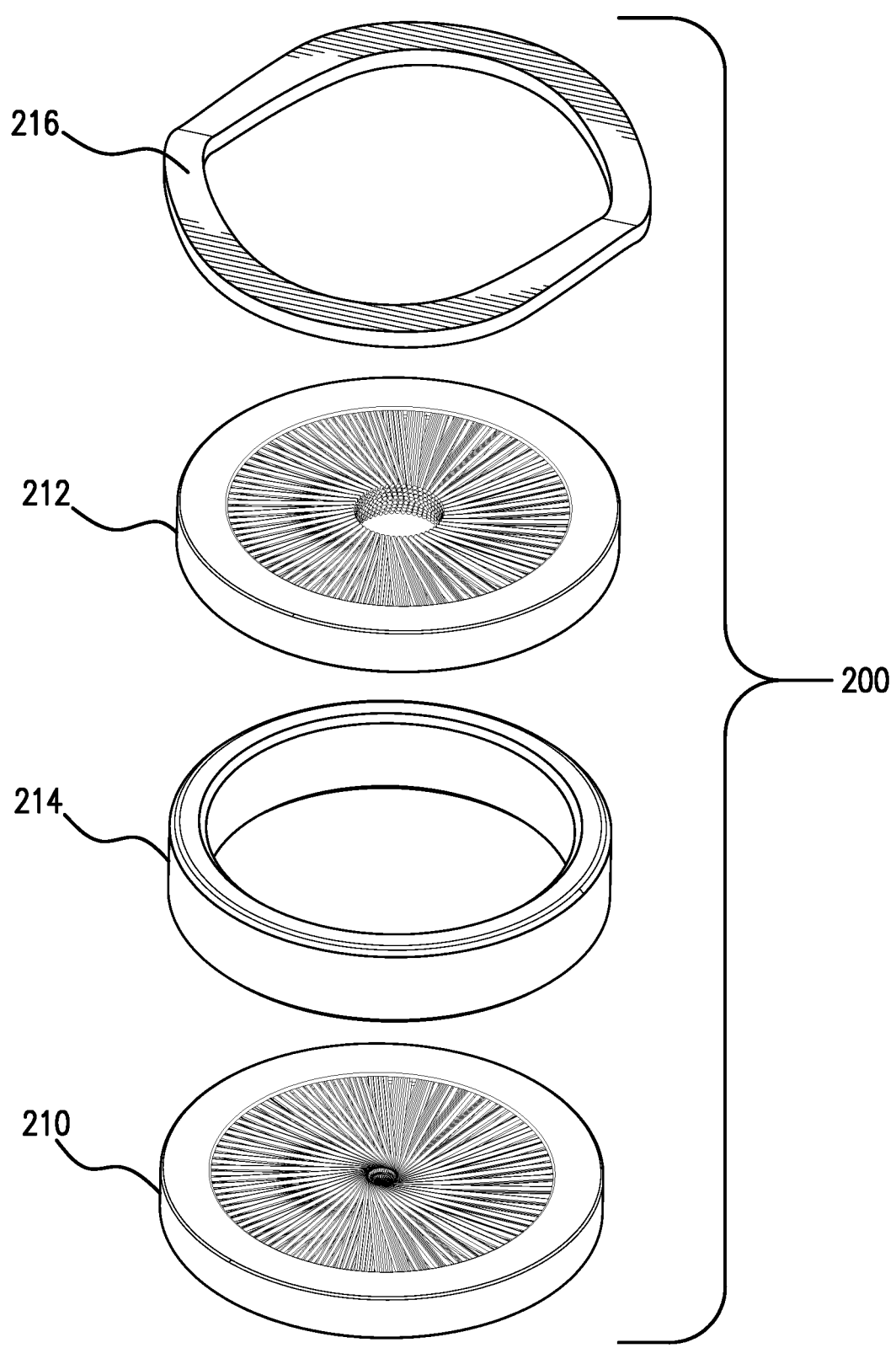
FIG. 7 is an exploded view of a barrier assembly for use in a protective device according to an exemplary embodiment of the present disclosure.

FIG. 7 illustrates an exemplary embodiment of a barrier assembly 200. The barrier assembly 200 sits within the body 110 (e.g., against the seat 120). The barrier assembly 200 is preferably factory installed in the body 110 to provide a pre-dammed protective device 100 for the installer. This embodiment saves considerable time and effort during installation. In the exemplary embodiment, the barrier assembly 200 includes two brush barriers 210/212. The brush barriers 210/212 may be of the type described in commonly owned U.S. Patent Application Nos. 62/873,329 and 63/018,869, the contents of which are incorporated herein by reference in their entireties. For example, each brush barrier 210/212 may include an outer ring or rim and a plurality of bristles secured to the outer rim. The bristles project inwardly and terminate to define an opening. The opening may be different sizes (e.g., about 10-25% of the outside diameter, such as about 14-20%) or, in some embodiments, the bristles terminate with little or no opening. In one embodiment, the bristles are each formed in a loop with the distal ends attached to the outer rim.

The brush barriers 210/212 may be manufactured in a plurality of different sizes and shapes to accommodate different applications. Further each of the two brush barriers 210/212 may have a different construction, e.g., one with more rigid bristles or a smaller central opening. In the exemplary embodiment, the bristles are comprised of synthetic fibers such as nylon, polyester, polypropylene, or other polymers. In other embodiments, the bristles may be comprised of natural fibers such as animal bristles (e.g., horsehair or other animal fibers) and vegetable fibers. The bristles may also be comprised of metal wire filaments (e.g., of carbon steel, stainless steel, galvanized steel, bronze, or brass) and, in some embodiments, contact the cable and/or portion thereof to provide a grounding path. The outer rim may be comprised of a metal such as carbon steel, stainless steel, galvanized steel, bronze, or brass. The outer rim may alternatively be comprised of polymer such as plastic.

A spacer 214 between the brush barriers 210/212 provides room for the bristles of the brush barriers 210/212 to flex without substantially interfering with one another. This helps to maintain a low force needed to push electrical conductors through the barrier assembly 200 and protective device 100. In the exemplary embodiment, the spacer 214 has a thickness that is at least equal to or preferably greater than a thickness of a brush barrier 210/212. In the exemplary embodiment, the spacer has a thickness of approximately twice the thickness of a brush barrier 210/212. In some embodiments, a spring may be used as or in place of the spacer 214 (see, e.g., FIGS. 10-11). A snap ring 216 engages in an internal groove 122 in the upper portion 125 of the body 110 to retain the barrier assembly 200 in place (see FIG. 3).

In some embodiments, the barrier assembly 200 includes only one brush barrier 210. In other embodiments, different types of barriers with or without bristles may be used. For example, the barrier may be a rubber membrane or may be a felt fiber barrier as disclosed in commonly owned U.S. Patent Application No. 63/018,869. Further, while preferred embodiments include a barrier assembly 200, some embodiments of the protective device 100 may be provided without a barrier assembly. A non-pre-dammed version of the protective device 100 may be provided for use with fiber packing inserted into the body 110 via the large opening created when the coupler 140 is unscrewed from the top member 130.

FIGS. 8A to 8C illustrate the protective device 100 in various configurations and stages of installation in a vertical position. FIG. 8A shows the protective device 100 in an open configuration engaged between a first conduit 302 and a second conduit 304. The body 110 and top member 130 are sufficiently spaced apart by a gap. This provides 360-degree access to the inside of protective device 100 in the open configuration for easily adding sealing compound 320, inspecting the electrical conductors 310 and seal, and, if necessary, feeding the electrical conductors 310 during installation. In some embodiments, the gap is at least one inch, such as 1.25 inches, 1.5 inches, 2 inches or more. As one skilled in the art will understand, protective devices 100 may be placed at various locations along an electrical conduit system such as between a hazardous location and a non-hazardous location to prevent vapors, sparks, or fire from propagating.

During installation, the body 110, with the coupler 140 around it, is screwed on or otherwise attached to the first conduit 302. The top member 130 is screwed on or otherwise attached to the second conduit 304. A plurality of conductors 310 are passed through the conduits 302/304 and through the protective device 100. The coupler 140 may be fully closed while the electrical conductors 310 are being fed or, if desired, opened to view and assist with the feeding process. Having the coupler 140 closed, with the snap ring 117 in the groove 150, may be desired in some applications to help ensure that the gap between the body 110 and the top member 130 is maintained and not reduced during installation (i.e., to avoid tension or slack in the electrical conductors). In some embodiments, an additional resistance or locking mechanism may be provided to ensure that the coupler 140 remains fully extended, such as a rubber element between the body 110 and coupler 140 or a set screw. The conductors 310 extend into and penetrate through the bristles of the brush barriers 210/212. The bristles of the brush barriers 210/212 receive and at least partially surround the conductors 310 while maintaining a sufficient barrier to prevent sealing compounds from leaking below the protective device 100.

FIG. 8B shows the protective device 100 in an open configuration engaged between the first conduit 302 and the second conduit 304. A sealing compound 320 (e.g., liquid epoxy) is poured into the protective device 100 while the protective device 100 is installed and in the open configuration. The barrier assembly 200 prevents the sealing compound 320 from passing beyond or leaking below the barrier assembly 200 before it cures within the protective device 100. Before closing the protective device 100, the seal can be easily inspected to ensure that an adequate seal has been made.

FIG. 8C shows the protective device 100 in a closed configuration engaged between the first conduit 302 and the second conduit 304. After the protective device 100 is filled with sealing compound 320 and cured, the coupler 140 is slid up along the body 110 and rotated to thread on to the top member 130 which closes the protective device 100 and completes the installation. The coupler 140 can, at any time, be unscrewed and lowered to inspect the protective device 100. The protective device can also be replaced with ease by lowering the coupler 140, unscrewing the body 110 and top member 130 from the respective conduits 304/305 and repeating the installation process with a new protective device 100. Although the attachment means between the coupler 140 and top member 130 and between the protective device 100 and conduits 302/304 are described as threaded engagements, alternative means known to those skilled in the art could be used. For example, the coupler 140 may attach to the top member 130 with a set screw. The coupler 140 may alternatively attach using a quick release mechanism such as a spring-loaded or fixed pin on one of the coupler 140 or top member 130 that engages into a hole or channel, respectively, on the other one of the coupler 140 or top member 130.

Figure 9:
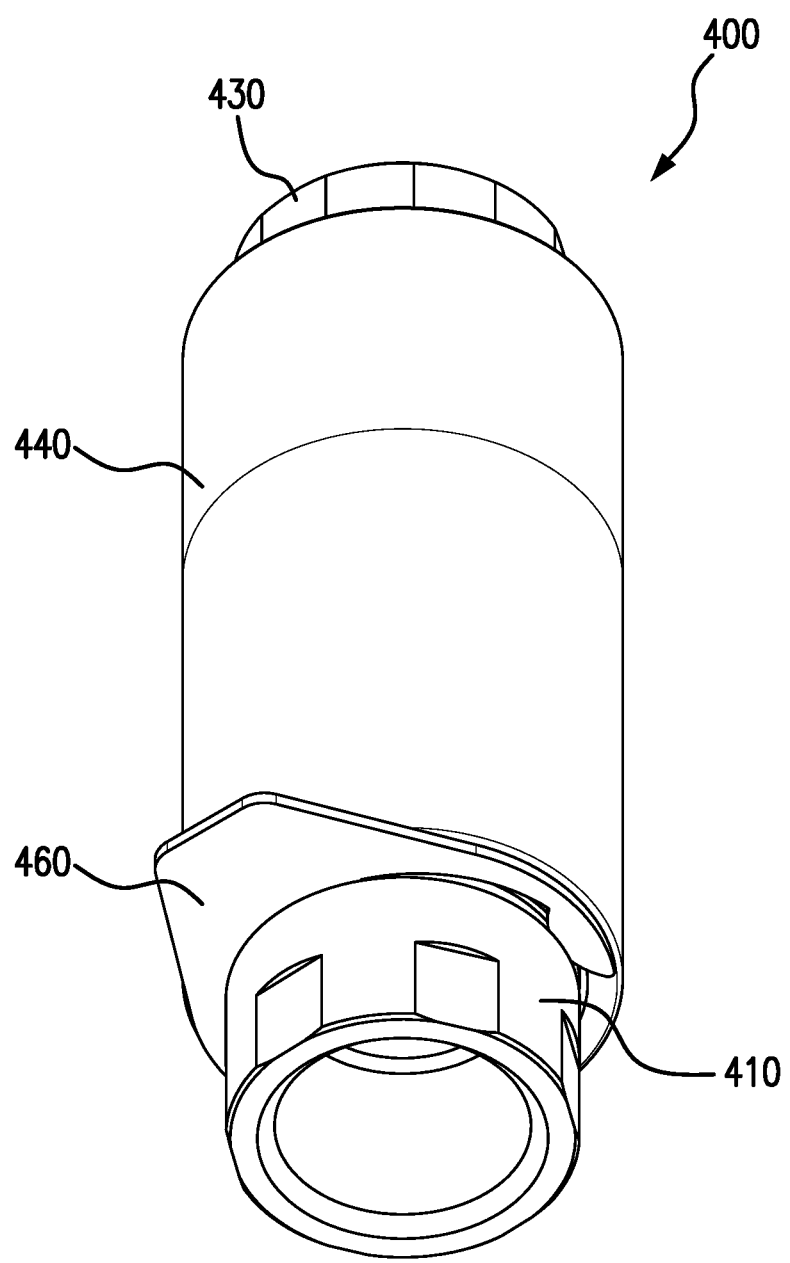
FIG. 9 is a bottom perspective view a protective device according to an exemplary embodiment of the present disclosure.
Figure 10:
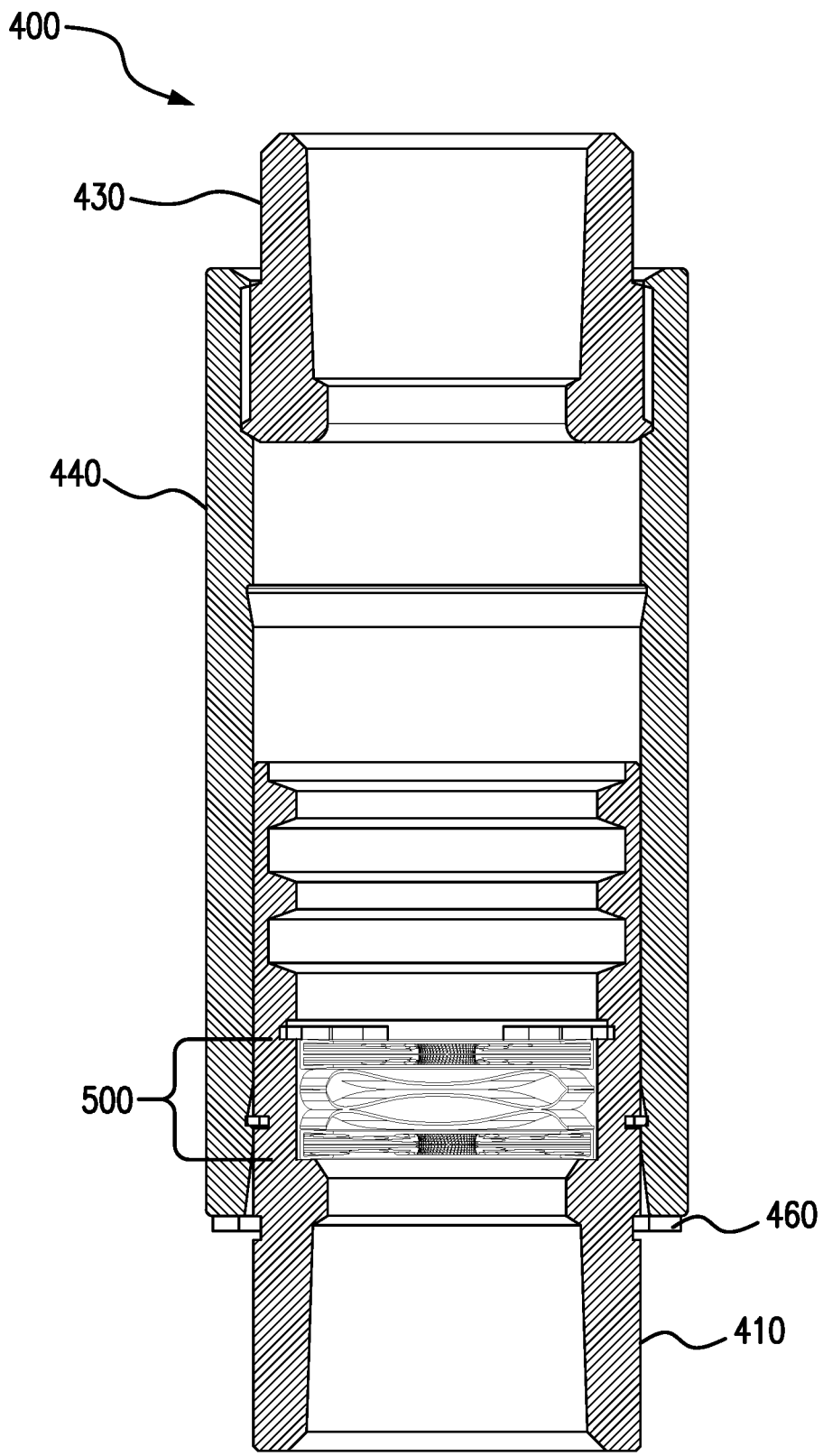
FIG. 10 is a side sectional view of the protective device shown in FIG. 9.

FIGS. 9-10 illustrate another protective device or fitting 400 according to an exemplary embodiment of the present disclosure. The protective device 400 includes a potting chamber or body 410, a top member 430, and a coupler 440 as in the examples discussed above.

The protective device 400 includes a positioning snap ring 460 that may be removably secured at least partially around an exterior of the body 410. In particular, the body 410 includes a groove below the coupler 440 to receive the positioning snap ring 460 when the coupler 440 is in a closed position. During installation of the protective device 400, the positioning snap ring 460 further ensures that proper spacing (e.g., one inch or more) is maintained between the body 410 and the top member 430. The positioning snap ring 460 may also secure the coupler 440 in the closed position and/or provide a visual indication that the coupler 440 is fully closed after installation.

The positioning snap ring 460 includes a grip portion extending radially outward from the body 410 for ease of installation and removal of the positioning snap ring 460. In some embodiments, the grip portion includes text or another visual indication on each of its top and bottom surfaces. For example, one surface may indicate that the protective device 400 is "not filled" with sealing compound while the other surface may indicate that the protective device 400 is "filled" with sealing compound. The installer can selectively install the positioning snap ring 460 with the appropriate visual indication facing up during and after the installation process for verification and inspection purposes.

Figure 11:
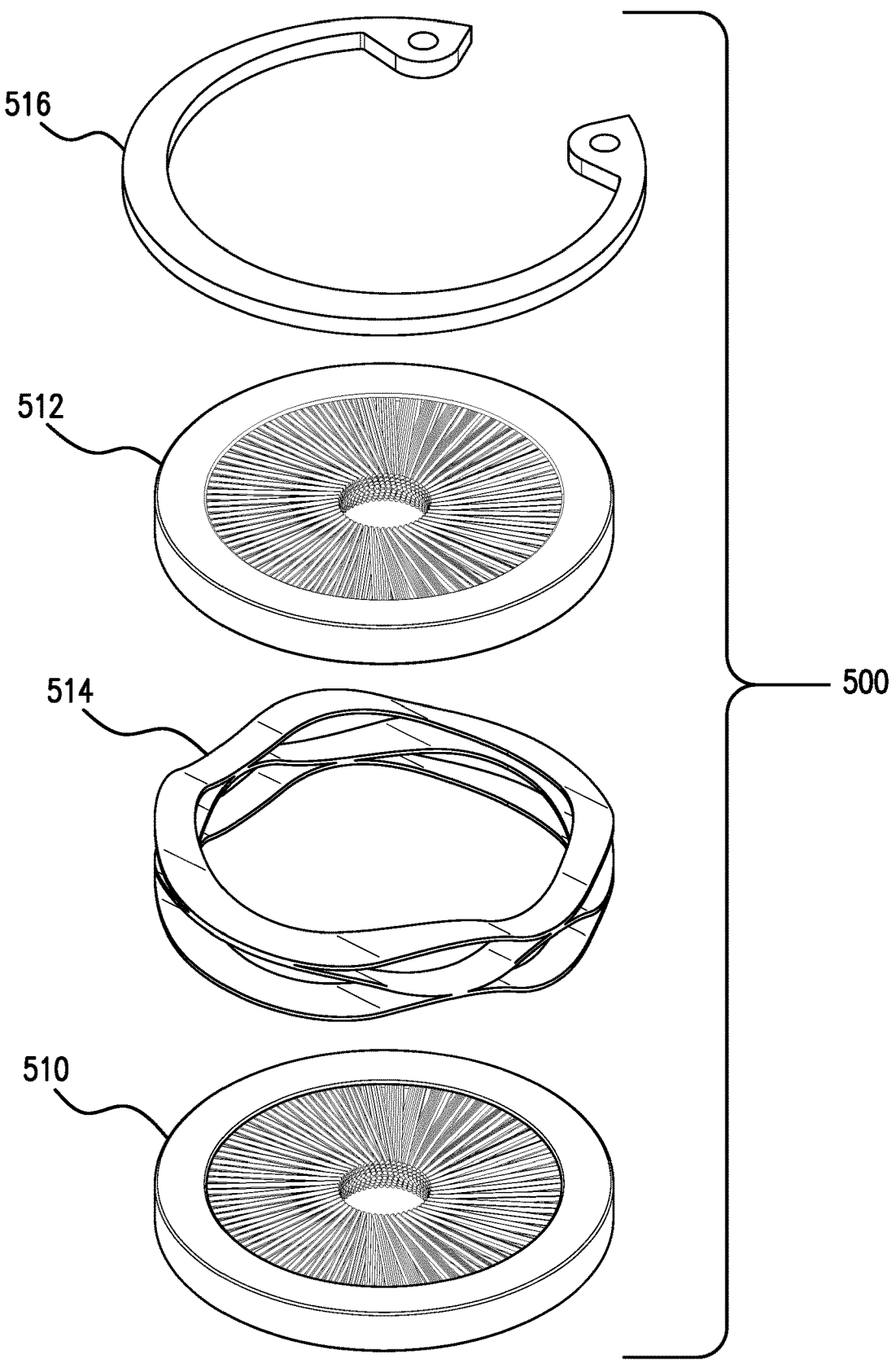
FIG. 11 is an exploded view of a barrier assembly of the protective device shown in FIG. 10.

The protective device 400 includes a barrier assembly 500 within the body 410 for retaining sealing compound. FIG. 11 further illustrates the barrier assembly 500. The barrier assembly 500 sits within the body 410 (e.g., against a seat). In the exemplary embodiment, the barrier assembly 500 includes two brush barriers 510/512 such as those already described above. For example, each brush barrier 510/512 may include an outer ring or rim and a plurality of bristles secured to the outer rim. The bristles project inwardly and terminate to define an opening.

A wave spring 514 is positioned between the brush barriers 510/512 to space them apart and provide room for the bristles of the brush barriers 510/512 to flex without substantially interfering with one another. The wave spring 514 further provides pressure between the brush barriers 510/512 to ensure that they are properly retained in their respective positions. This is particularly useful while the protective device 400 is being filled with sealing compound so that there is no leakage of sealing compound around the outside edges of the brush barriers 510/512. In the exemplary embodiment, the wave spring 514 spaces the brush barriers 510/512 apart by a distance that is at least equal to or preferably greater than a thickness of a brush barrier 510/512. In some applications, other springs such as a coil spring may be used in place of the wave spring 514.

A snap ring 516 engages in an internal groove in the upper portion of the body 410 to retain the barrier assembly 500 in place (see, e.g., FIG. 3). In the exemplary embodiment, the snap ring 516 is a circlip retaining ring having tabs with holes to enable installation and removal of the snap ring 516 with circlip pliers.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A protective device for electrical conduit systems, comprising:
a body having a lower opening for engaging with a first conduit and a central cavity for receiving conductors extending from the first conduit to a second conduit;
a top member having an upper opening for engaging with the second conduit; and
a coupler slidably engaged around said body and having a proximal end and a distal end, said coupler slidable between an open position, in which the distal end of said coupler is adjacent to said body and spaced apart from said top member, and a closed position in which the distal end of said coupler is attached to said top member.

2. The protective device of claim 1, wherein said body and said top member are spaced apart by a gap providing 360-degree access to the central cavity when said coupler is in the open position.

3. A protective device for electrical conduit systems, comprising:
a body having a lower opening for engaging with a first conduit and a central cavity for receiving conductors extending from the first conduit to a second conduit;
a top member having an upper opening for engaging with the second conduit;
a coupler slidably engaged around said body, said coupler slidable between an open position distal to said top member and a closed position attached to said top member; and
a barrier assembly within the cavity of said body, the barrier assembly at least partially penetrable by the conductors extending from the first conduit to the second conduit.

4. The protective device of claim 3, wherein the barrier assembly includes at least one brush barrier having an outer rim and a plurality of bristles attached to and extending inwardly from the outer rim, the conductors passing through the bristles.

5. The protective device of claim 4, wherein the outer rim of the brush barrier is comprised of at least one of brass, galvanized steel, stainless steel, or a polymer.

6. The protective device of claim 4, wherein the bristles of the brush barrier are comprised of a synthetic fiber or a natural fiber.

7. The protective device of claim 4, wherein the bristles of the brush barrier are comprised of metal.

8. The protective device of claim 3, wherein the barrier assembly includes two brush barriers each having an outer edge and a plurality of bristles extending inwardly from the outer edge, the conductors passing through the bristles, and a spacer between the two brush barriers.

9. The protective device of claim 8, wherein the spacer is a wave spring.

10. The protective device of claim 3, wherein the cavity of said body includes a seat receiving the barrier assembly.

11. The protective device of claim 10, wherein the barrier assembly includes a stop element, wherein said body includes an internal groove receiving the stop element and securing the barrier assembly between the seat and the stop element.

12. The protective device of claim 3, further comprising a sealing compound within said body adjacent to the barrier assembly.

13. The protective device of claim 1, wherein said coupler is attached to said top member in the closed position via a threaded engagement.

14. The protective device of claim 1, wherein said body includes a groove on an exterior surface and a snap ring in the groove between said body and said coupler, wherein said coupler includes an upper groove engaging with the snap ring in the open position.

15. The protective device of claim 14, wherein said coupler includes a lower groove engaging with the snap ring in the closed position.

16. The protective device of claim 1, wherein said body includes a groove on an exterior surface and a positioning snap ring removably positionable in the groove below a lower edge of said coupler when said coupler is in the closed position.

17. A protective device, comprising:
a body having a lower opening, an upper opening, and a cavity extending between the lower and upper openings;
a barrier assembly within the cavity of said body;
a top member having an upper opening; and
a coupler slidably engaged around said body, said coupler slidable between an open position distal to said top member and a closed position attached to said top member,
wherein said body includes a first groove on an exterior surface and a snap ring in the first groove between said body and said coupler, wherein said coupler includes an upper groove engaging with the snap ring in the open position and a lower groove engaging with the snap ring in the closed position.

18. The protective device of claim 17, wherein the barrier assembly includes at least one brush barrier having an outer rim and a plurality of bristles attached to and extending inwardly from the outer rim.

19. The protective device of claim 17, wherein the barrier assembly includes two brush barriers each having an outer edge and a plurality of bristles extending inwardly from the outer edge, and a spacer between the two brush barriers.

20. The protective device of claim 19, wherein the spacer is a wave spring.

21. The protective device of claim 17, wherein the cavity of said body includes a seat receiving the barrier assembly.

22. The protective device of claim 17, wherein said body includes a second groove on the exterior surface and a positioning snap ring removably positionable in the second groove below a lower edge of said coupler when said coupler is in the closed position.

23. A method of installing a protective device in an electrical conduit system, comprising steps of:
providing a protective device including body having a lower opening, an upper opening, and a cavity extending between the lower and upper openings, a barrier assembly within the cavity of the body, a top member having an upper opening, and a coupler slidably engaged around the body, the coupler slidable between an open position distal to the top member and a closed position attached to the top member;
securing the body of the protective device, via the lower opening of the body, to a first conduit;
securing the top member of the protective device, via the upper opening of the top member, to a second conduit;
passing a plurality of conductors from the first conduit, through the cavity of the body by penetrating through the barrier assembly, and into the second conduit;
at least partially filling the body with a sealing compound with the coupler in the open position; and
closing the protective device by moving the coupler to the closed position.

24. The method of claim 23, wherein the barrier assembly includes two brush barriers each having an outer rim and a plurality of bristles attached to and extending inwardly from the outer rim, the conductors passing through the bristles to penetrate the barrier assembly, and a spacer between the two brush barriers.

25. The method of claim 24, wherein the spacer is a wave spring.

26. The method of claim 23, wherein, while securing the body to the first conduit and securing the top member to the second conduit, the coupler is retained in the closed position via a positioning snap ring engaged in a groove on an exterior surface of the body and below a lower edge of the coupler.

27. The protective device of claim 3, wherein the coupler has a proximal end and a distal end, wherein in the open position the distal end of the coupler is adjacent to the body and spaced apart from the top member, and in the closed position the distal end of the coupler is attached to the top member.

* * * * *